March 30, 1937.         S. E. GREEN         2,075,280
BEARING
Filed Nov. 19, 1934

INVENTOR:
SVEN E. GREEN,
BY *Jales G. Ivance*
HIS ATTORNEY.

Patented Mar. 30, 1937

2,075,280

UNITED STATES PATENT OFFICE 2,075,280

BEARING

Sven E. Green, Bristol, Conn., assignor to General Motors Corporation, Detroit, Mich., a corporation of Delaware Application November 19, 1934, Serial No. 753,694

3 Claims. (Cl. 308—196)

This invention relates to bearings and comprises all of the features of novelty herein disclosed. An object of the invention is to provide an improved device for securing together a pair of abutting parts such as the race rings of an antifriction bearing. Another object is to provide simple and effective means to facilitate the assembly and the securing together of parts of a bearing. Another object is to provide an improved roller tooth follower or the like.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a cross-sectional view of the bearing device.

Figure 1:
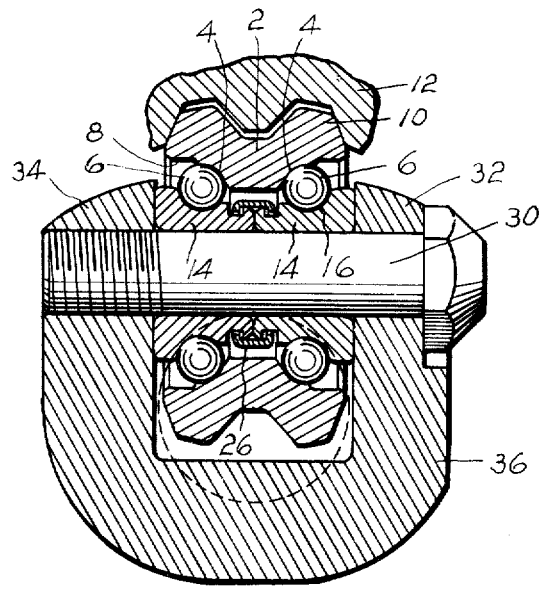
Figure 2:
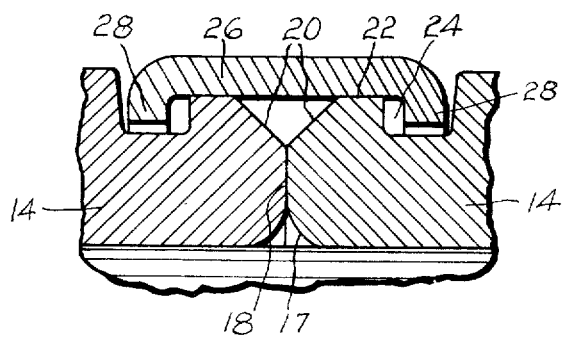
Fig. 2 is an enlarged sectional view of a portion of the device of Fig. 1.
Figure 3:
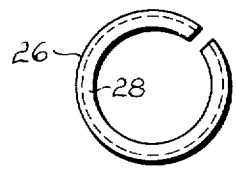
Fig. 3 is a side view of a snap ring.

The member 2 constitutes a rotary part which, in the present selected embodiment, is a roller tooth follower having angular contact raceways 4 for two rows of rolling elements 6, herein shown as balls. The raceways conform quite closely to the balls for nearly 90° and are formed on the opposite sides of a central internal rib of the member 2. Beyond the raceways, the member 2 has counterbores 8 so that the balls can be easily inserted in their raceways. Externally, the member 2 is shown as having two annular projections 10 constituting teeth to engage and follow the threads of a worm 12 but this is not essential.

A pair of abutting inner race rings 14 are provided with angular contact raceways 16 for the balls 6, these raceways extending well up on the outer sides of the rows of balls in order to provide great thrust capacity. Prior to mounting the bearing (comprising the outer race member 2, the balls 6, and the inner race rings 14), either race ring 14 and its row of balls 6 could readily separate from the other parts by axial shifting in the absence of securing means which is a part of the invention.

The rings 14 have their adjacent ends chamfered internally as at 17 but outside of their flat abutting surfaces 18, the ends are provided with outwardly extending cams or inclines 20 forming a V-shaped groove. The inclines terminate at cylindrical surfaces or projections 22 and between these projections and the raceways 16, the rings have peripheral grooves 24. A split snap ring 26 encircles the ribs or projections 22, the sides of the ring having inwardly turned flanges 28 which enter the grooves 24. The ring 26 has an inherent tendency to contract but can be temporarily spread out or opened up to get the flanges over the projections 22 into the grooves, such opening up occurring whenever one of the flanges 28 rides up the incline or cam 20, as by relative axial shifting in one direction. Once assembled, the race rings cannot easily be pulled apart because the flanges will engage the vertical walls of the grooves 24. A slight separation of the surfaces 18 can occur because the flanges are narrower than the grooves but this relieves the balls and races of internal load until the bearing is mounted on a support.

A headed bolt 30 is shown passed through the bore of the race rings 14 and through the two arms 32 and 34 of a supporting fork 36, the bolt being threaded in the arm 34. The race rings 14 are so faced off at 18 that when the bolt is screwed home, the arms 32 and 34 force the race rings into solid abutting contact and, when such contact occurs, a predetermined initial load is on the rolling elements which cannot be exceeded. The fork 36 may be part of a vehicle steering mechanism, for example, and is swung around a shaft or axis indicated by the dotted circle in Fig. 1 when the worm 12 is rotated.

I claim:

1. In a device of the character described, an outer race ring having a pair of raceways on opposite sides of a central rib, a row of rolling elements for each raceway and the raceways being open laterally to receive the rolling elements, a pair of inner race rings each having a raceway for one of said rows, the ends of said inner race rings having flat abutting faces and cam surfaces inclined outwardly therefrom, the inner race rings having continuous and uninterrupted internal bores substantially from end to end for supporting contact with a shaft and peripheral grooves between said cam surfaces and the raceways, and a snap ring between the rows of rolling elements and surrounding the cam surfaces and those portions of the inner race rings between the cam surfaces and the peripheral grooves, the ring having inwardly projecting side flanges entering the peripheral grooves, the snap ring having inherent tendency to contract so that the flanges lie in alignment with the cam surfaces ready to ride up the cam surfaces on relative approaching movement between the inner race rings; substantially as described.

2. In a device of the character described, a race ring having a pair of raceways, a row of rolling elements for each raceway, a pair of abutting race rings each having a raceway for one of said rows, said abutting race rings having inclined cam surfaces at their abutting ends and peripheral grooves, a snap member having side flanges to ride up said cam surfaces and enter the grooves, and the flanges being normally out of contact with the side walls of the peripheral grooves; substantially as described.

3. In a device of the character described, a roller having a tooth externally and a pair of raceways internally, a pair of inner race rings having raceways, rolling elements between the raceways, the inner race rings having at abutting faces and cam surfaces inclined outwardly away from said abutting faces, a snap member adapted to be expanded by contact with said cam surfaces upon approach of the latter, the snap member surrounding portions of the inner race rings between the rows of rolling elements, the internal bores of the inner race rings being substantially continuous and uninterrupted from end to end, and a supporting shaft engaging said bores to provide continuous support for the inner race rings from end to end; substantially as described.

SVEN E. GREEN.

CERTIFICATE OF CORRECTION.

Patent No. 2,075,280.    March 30, 1937

SVEN E. GREEN.

It is hereby certified that error appears in the printed specification of the above numbered patent requiring correction as follows: Page 2, first column, line 14, claim 3, for the word "at" read flat; and that the said Letters Patent should be read with this correction therein that the same may conform to the record of the case in the Patent Office Signed and sealed this 25th day of May, A. D. 1937.

(Seal)

Henry Van Arsdale
Acting Commissioner of Patents.

rolling elements for each raceway, a pair of abutting race rings each having a raceway for one of said rows, said abutting race rings having inclined cam surfaces at their abutting ends and peripheral grooves, a snap member having side flanges to ride up said cam surfaces and enter the grooves, and the flanges being normally out of contact with the side walls of the peripheral grooves; substantially as described.

3. In a device of the character described, a roller having a tooth externally and a pair of raceways internally, a pair of inner race rings having raceways, rolling elements between the raceways, the inner race rings having at abutting faces and cam surfaces inclined outwardly away from said abutting faces, a snap member adapted to be expanded by contact with said cam surfaces upon approach of the latter, the snap member surrounding portions of the inner race rings between the rows of rolling elements, the internal bores of the inner race rings being substantially continuous and uninterrupted from end to end, and a supporting shaft engaging said bores to provide continuous support for the inner race rings from end to end; substantially as described.

SVEN E. GREEN.

CERTIFICATE OF CORRECTION.

Patent No. 2,075,280. March 30, 1937

SVEN E. GREEN.

It is hereby certified that error appears in the printed specificatio of the above numbered patent requiring correction as follows: Page 2, first column, line 14, claim 3, for the word "at" read flat; and that the said Letters Patent should be read with this correction therein that the same may conform to the record of the case in the Patent Office Signed and sealed this 25th day of May, A. D. 1937.

(Seal)

Henry Van Arsdale
Acting Commissioner of Patents.

CERTIFICATE OF CORRECTION.

Patent No. 2,075,280. March 30, 1937

SVEN E. GREEN.

It is hereby certified that error appears in the printed specification of the above numbered patent requiring correction as follows: Page 2, first column, line 14, claim 3, for the word "at" read flat; and that the said Letters Patent should be read with this correction therein that the same may conform to the record of the case in the Patent Office
Signed and sealed this 25th day of May, A. D. 1937.

(Seal)

Henry Van Arsdale
Acting Commissioner of Patents.